(12) United States Patent
Beatty

(10) Patent No.: US 7,784,796 B2
(45) Date of Patent: Aug. 31, 2010

(54) SHAFT INTERFACE DEBRIS SEAL

(75) Inventor: Glen R. Beatty, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 788 days.

(21) Appl. No.: 11/684,034

(22) Filed: Mar. 9, 2007

(65) Prior Publication Data

US 2008/0217863 A1 Sep. 11, 2008

(51) Int. Cl.
*F16J 15/32* (2006.01)
(52) U.S. Cl. .................................. 277/560; 277/567
(58) Field of Classification Search ................ 277/549, 277/560, 562, 563, 566, 567, 569, 572, 573, 277/575; 464/170
See application file for complete search history.

(56) References Cited

U.S. PATENT DOCUMENTS 2,088,703 A * 8/1937 Hubbard et al. ......... 277/562 X
3,363,911 A * 1/1968 McKinven, Jr.
2005/0110221 A1 * 5/2005 Oates ......................... 277/549

* cited by examiner

*Primary Examiner*—Greg Binda
(74) *Attorney, Agent, or Firm*—Quinn Law Group, PLLC

(57) ABSTRACT

A sealing assembly is provided for sealing an interface between two shafts, including a primary and secondary seal and a rotatable shaft sleeve having inner and outer sleeves forming a sealing cavity therebetween, and enclosing one of the seals. The secondary seal contacts the outer sleeve, and the primary seal contacts the inner sleeve, with the secondary seal circumscribing part of the primary seal. The seals each have a pair of sealing lips forming a sealing cavity therebetween, with one pair of sealing lips being sufficiently shaped to contact the inner sleeve, and the other pair of sealing lips being sufficiently shaped to contact the outer sleeve. A fluid fills the sealing cavities to provide a barrier to debris. The seals are bonded to a seal arm positioned adjacent the housing in contact therewith. The secondary seal is positioned between the sleeve and housing, and circumscribing the interface.

15 Claims, 2 Drawing Sheets

SHAFT INTERFACE DEBRIS SEAL

TECHNICAL FIELD

The present invention relates to a seal for use with a pair of rotating vehicle shafts, and in particular to a shaft sealing assembly for sealing a shaft interface formed between two connected shafts, the assembly having an outer or secondary shaft seal configured to seal and protect both an inner or primary shaft seal and the shaft interface from debris and other contaminants.

BACKGROUND OF THE INVENTION

In an automotive powertrain, a transmission output shaft transmits rotational force or torque from the transmission to one or more drive shafts or axles in order to propel the vehicle. Vehicles equipped with front-wheel or all-wheel drive systems are generally equipped with constant velocity (CV) joints, which allow the vehicle to more efficiently transmit torque from a rotating output shaft to a drive shaft or shafts through a range of joint operating angles, such as are experienced while the vehicle is turning. CV joints may take the form of, for example, ball joints, universal or U-joints, and/or tripot joints.

The locus of engagement, or shaft interface, formed or positioned between of a pair of rotating shafts, or between a rotating output shaft and a CV joint, may be exposed to a substantial amount of debris and other environmental contaminants. Debris may take the form of water, dirt, and/or oil from a road surface or that is discharged from the vehicle powertrain. Therefore, a flexible shaft or axle seal is typically used to protect the shaft interface, thereby preventing this debris from entering the transmission, where it may potentially damage the gears or other transmission components. The shaft seal also serves to retain special gear oil within the transmission case, as the loss of gear oil around or through a damaged or worn shaft seal may adversely affect the performance of the transmission.

Shaft seals may include a thin, stamped metal carrier, to which is bonded or attached a flexible rubber or polymeric sealing material having a one or more sealing lips. The sealing lips are typically shaped or adapted to seal against a radially outward surface of an output shaft sleeve, which is press-fitted into the drive shaft or half shaft to rotate in conjunction therewith. The stamped metal carrier allows the seal to be press-fitted into the stationary transmission case, and also provides some level of protection to the sealing material. However, such sealing devices may be less than optimal depending on the amount of foreign debris and/or ensuing corrosion or chemical attack thereto as the debris attacks the exposed surfaces of the seal.

SUMMARY OF THE INVENTION

Accordingly, a shaft sealing assembly is provided for sealing a shaft interface from debris within a vehicle powertrain having a transmission housing and a pair of operatively connected, rotatable shafts forming the shaft interface therebetween.

The assembly includes a primary and a secondary seal formed of a flexible sealing material, and a shaft sleeve having an inner and outer sleeve forming a sealing cavity therebetween. The shaft sleeve circumscribes the interface and the sealing cavity encloses one of the seals, with the secondary seal positioned adjacent to the outer sleeve, and with the primary seal positioned adjacent the inner sleeve. The secondary seal circumscribes part of the primary seal to minimize exposure of the primary seal to the debris.

In one aspect of the invention, the primary seal has a first pair of sealing lips forming a first sealing cavity therebetween and shaped to contact the inner sleeve. The secondary seal has a second pair of sealing lips forming a second sealing cavity therebetween and shaped to contact the outer sleeve.

In another aspect of the invention, a lubricating fluid fills the first and second sealing cavities to provide a further barrier to the debris.

In another aspect of the invention, a stationary seal arm is positioned adjacent to the transmission housing and in contact therewith, and the primary seal and secondary seals are bonded to the stationary seal arm. The secondary seal is positioned between the sleeve and the housing, and at least partially circumscribing the interface.

In another aspect of the invention, the sleeve has a side sleeve portion joining the inner and the outer sleeve, and at least one of the seals are positioned approximately 1 to 8 millimeters from the side sleeve portion to form a suitable end gap accounting for axial motion of the shafts.

In another aspect of the invention, an axle seal is provided for minimizing exposure of an axle joint to debris, the axle seal having an inner and an outer sleeve, a seal cavity formed between the sleeves, and flexible sealing material within the seal cavity. The flexible sealing material has a first set of seal lips forming a primary sealing surface against the inner sleeve, and a second set of sealing lips forming a secondary sealing surface against the outer sleeve, with the secondary sealing surface positioned to minimize exposure of the axle joint to the debris.

In another aspect of the invention, a vehicle powertrain is provided having a transmission housing, a transmission output shaft, a drive shaft connected to the transmission output shaft to form a shaft interface, and a shaft sleeve forming an internal sleeve cavity and operatively connected to the output and drive shafts to rotate therewith. The shaft sleeve circumscribes the interface, and a flexible shaft seal is at least partially enclosed within the internal sleeve cavity and has a primary and secondary seal, the seals being positioned adjacent to different surfaces of the sleeve. The secondary seal circumscribes the primary seal to minimize exposure of the primary seal to debris.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
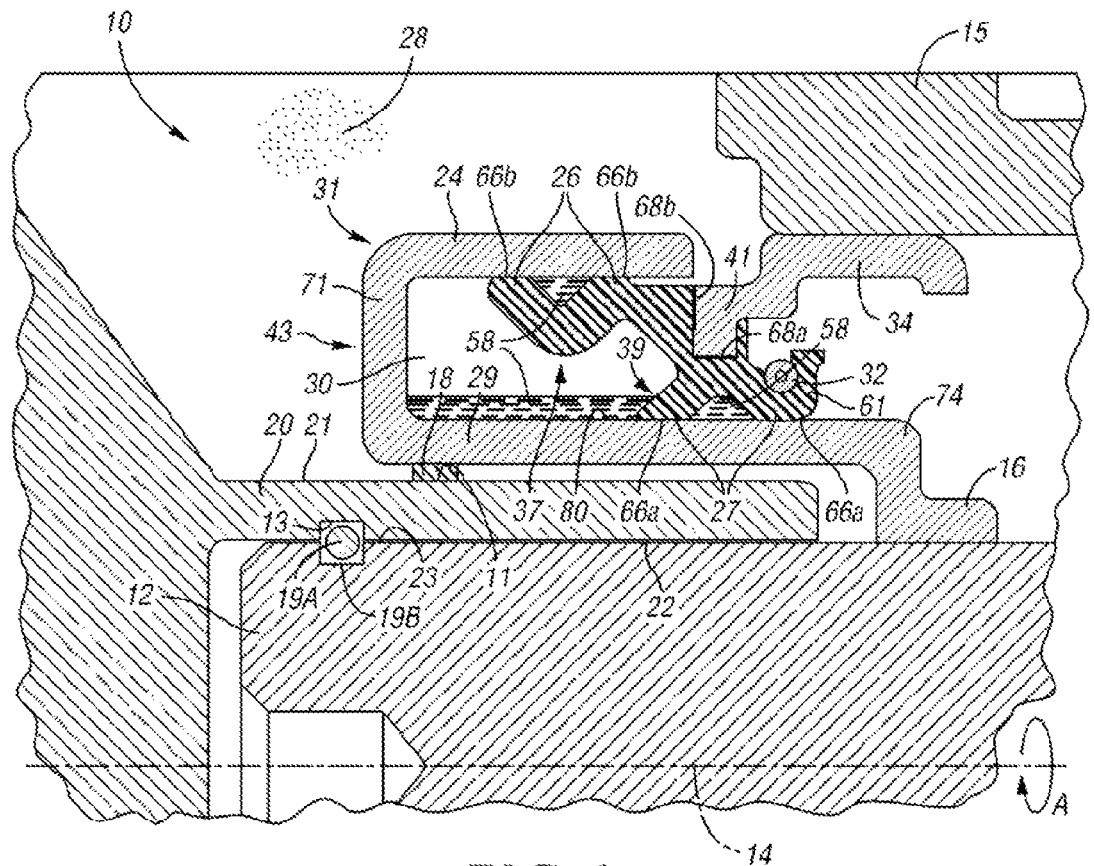
FIG. 1 is a schematic cutaway cross-sectional view of a vehicle axle sealing assembly according to the invention.

Referring to the drawings wherein like reference numbers correspond to like or similar components throughout the several figures, there is shown in FIG. 1 a portion of a vehicle powertrain 10 having a first shaft 12, such as a transmission output shaft or other such rotating shaft having a rotational force or torque (arrow A), and a second shaft 20, such as a drive shaft or half-shaft configured or adapted for delivering or transmitting the torque to a pair of drive wheels (not shown), or any other such shaft in similar driving engagement with first shaft 12.

First shaft 12 and second shaft 20 are coaxially aligned about a common axis of rotation 14, with second shaft 20 at least partially circumscribing first shaft 12 as shown. As will be understood by those of ordinary skill in the art, although not shown in FIG. 1, second shaft 20 may be operatively connected to a tripot or other CV joint, differential, and/or another powertrain device configured to transfer and/or distribute torque to one or more drive shafts or axles. Shafts 12 and 20 are preferably connected or engaged along a shaft interface 22, such as intermeshed mating gears or spline teeth (not shown). Second shaft 20 has an inner circumferential retaining ring groove 13 formed in an inner diameter or surface 23 of second shaft 20. First and second shafts 12 and 20 are mutually retained using a retaining ring 19A or other suitable retaining device that is disposed or positioned within retaining ring groove 13 and within a similar circumferential retaining ring groove 19B formed in the first and second shafts 12 and 20. Retaining ring 19A exerts a sufficient axial retaining force on both of the first and second shafts 12 and 20 for minimizing displacement thereof while shafts 12, 20 are rotating about axis of rotation 14.

In accordance with the invention, powertrain 10 has a shaft seal assembly 31, such as an axle seal assembly, positioned between outer surface 21 of second shaft 20 and a stationary housing or case 15, such as a transmission case or other such stationary surface. Shaft seal assembly 31 is sufficiently configured to provide two levels of sealing protection to shaft interface 22, thereby minimizing the amount of debris 28, such as road dirt, grime, oil, and/or other foreign solid or liquid aerosol, that may enter second shaft 20 through shaft interface 22.

Shaft seal assembly 31 is therefore formed, shaped, or otherwise configured to include a rotatable shaft sleeve 43 circumscribing interface 22, a stationary outer seal arm 34 formed integrally with or attached to an inner seal arm 41, and a secondary shaft seal 37 at least partially circumscribing a primary shaft seal 39 with respect to axis of rotation 14. Shaft seals 37 and 39 are preferably formed of rubber, polymeric, and/or composite sealing material, such as a fluoroelastomer/ fluorocarbon, silicone, ethylene-propylene elastomer (EPR), polytetrafluoroethylene (PTFE), and/or nitrile rubber. Secondary seal 37 includes a pair of secondary sealing lips 26 for sealing against secondary sealing surfaces 66b. Likewise, primary seal 39 includes a pair of primary sealing lips 27 for sealing against primary sealing surfaces 66a, as will now be described in further detail.

Figure 2:
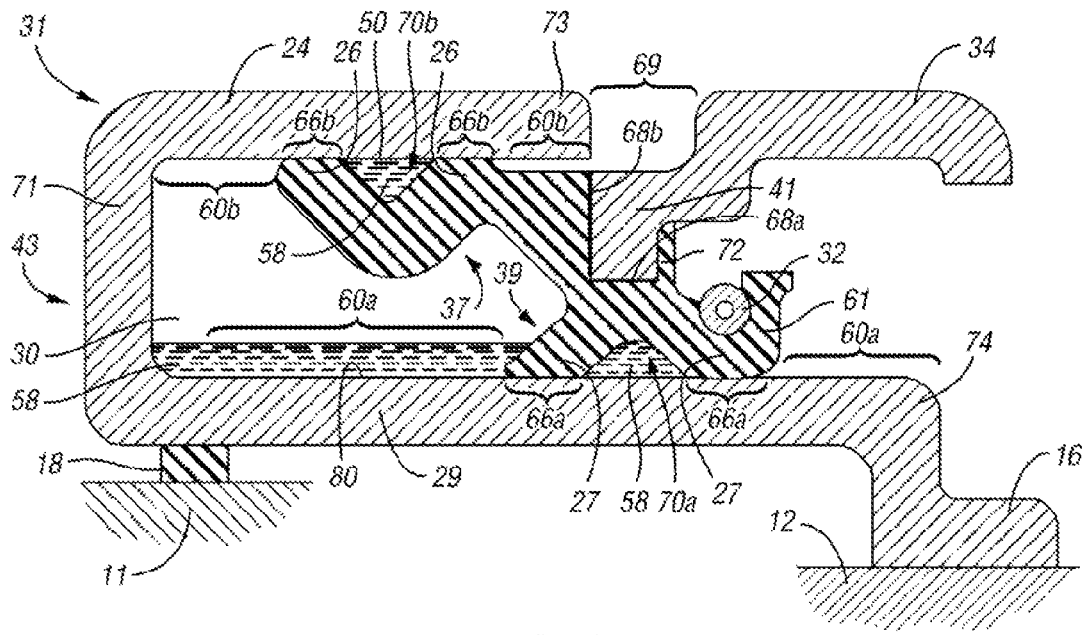
FIG. 2 is a schematic cutaway cross-sectional view of the output shaft sleeve and sealing material of the apparatus of FIG. 1.

Turning to FIG. 2, which shows shaft seal assembly 31 of FIG. 1 in a greater level of detail, sleeve 43 includes an inner sleeve 29, an outer sleeve 24, and a sleeve wall or side sleeve 71. Inner and outer sleeves 29 and 24, respectively, are interconnected or joined via side sleeve 71, with sleeves 29, 24, and 71 preferably integrally formed from a single piece of shaped and/or stamped metal. Outer sleeve 24 terminates in a free end 73 and has an inner surface or diameter 50, i.e. an axially-extending surface positioned radially inward with respect to the axis of rotation 14. Free end 73 is preferably separated from stationary arm 34 by a center gap 69.

Inner sleeve 29 has an outer surface or diameter 80, i.e. an axially-extending surface positioned radially outward with respect to axis 14, and an end 74 positioned adjacent to a press-diameter or sleeve foot 16. Sleeve foot 16 is press-fitted onto first shaft 12 as shown so that the sleeve 43 is driven by and rotates in conjunction with first and second shafts 12 and 20, respectively. Inner sleeve 29 extends axially along shafts 12 and 20 and spans the distance between sleeve foot 16 and a sealing member 18 formed of flexible sealing material, as previously described with respect to primary and secondary seals 39 and 37, respectively. Sealing member 18 has an interference fit against outer surface 21 of second shaft 20 and inner sleeve 29, thereby forming a sealing surface 11.

Outer sleeve 24 of sleeve 43 preferably extends axially approximately midway along the length of inner sleeve 29 and is positioned parallel thereto to at least partially form a main cavity 30 between inner sleeve 29 and outer sleeve 24, and bounded on one side by side sleeve 71. Within main cavity 30, secondary seal 37 is sufficiently formed to provide a pair of secondary seal lips 26 having or forming a secondary seal cavity 70b therebetween, with the secondary seal cavity 70b bounded by inner surface or diameter 50 of outer sleeve 24.

As shown in FIG. 2, secondary seal 37 is positioned adjacent to outer surface 24 in contact therewith. Secondary seal 37 is preferably shaped with a V-profile, with the legs of the "V" forming secondary seal lips 26 for sealing against outer sleeve 24 along a pair of sealing surfaces 66b, as previously described hereinabove. Also as shown, main cavity 30 and secondary seal cavity 70b are preferably pre-loaded or at least partially filled with a lubricating fluid 58, such as axle grease, having a viscosity and chemical composition suitable for providing an additional barrier or layer of sealing protection to primary seal 37. Main cavity 30 may also be pre-loaded or partially filled with lubricating fluid 58 to likewise provide an additional barrier or layer of sealing protection if so desired.

Additionally, a pair of end gaps 60b flank the secondary seal 37, with one end gap 60b positioned between side sleeve 71 and secondary seal 37, and another end gap 60b positioned between secondary seal 37 and free end 73. The preferred length of each end gap 60b is the length sufficient to allow for "end play" or axial motion of secondary seal 37 in either axial direction due to any corresponding axial motion of shafts 12 and 20, with secondary seal 37 preferably positioned approximately midway between side sleeve 71 and free end 73 to provide substantially balanced or equal length end gaps 60b. Each end gap 60b is also preferably approximately equal to the length of center gap 69, and approximately 1 to 8 millimeters in length, although other lengths are usable within the scope of the invention depending on the particular design parameters of a given powertrain.

Still looking within main cavity 30, secondary seal 37 is further bonded or attached to the stationary inner seal arm 41 along a bonding surface 68b. Inner seal arm 41 is likewise bonded or attached to primary seal 39 along a bonding surface 68a, with primary seal 39 formed or shaped in a similar manner to that of secondary seal 37, as previously described, with some additional retention features as described hereinbelow.

Specifically, primary seal 39 is positioned adjacent to inner sleeve 29 and in contact therewith. Primary seal 39 includes a pair of primary seal lips 27 having a primary seal cavity 70a therebetween. Like secondary seal 37, primary seal 39 is preferably shaped with a V-profile, with the legs of the "V" forming or providing a pair of primary sealing lips 27 for sealing against inner sleeve 29 along a pair of sealing surfaces 66a on the outer surface or diameter 80 of inner sleeve 29. Also, primary seal cavity 70a is preferably pre-loaded or filled with lubricating fluid 58, such as grease, as previously described hereinabove with respect to main cavity 30 and secondary seal cavity 70a, and likewise provides an additional sealing layer or barrier.

Additionally, an end gap 60a is provided between side sleeve 71 and primary seal 39, and another between primary seal 39 and end 74, with the length of each end gap 60a being sufficient to allow for "end play" or axial motion of primary seal 39, as previously described hereinabove with respect to end gaps 60b and secondary seal 37. To improve or facilitate the manufacturability of sealing assembly 31, and to increase the bonding strength of primary seal 39 and secondary seal 37 to inner seal arm 41, a connecting seal 72 preferably extends between and interconnects primary and secondary seals 39 and 37, respectively, while also bonding to inner seal arm 41 as shown.

Primary seal 39 further includes a retaining portion 61, with retaining portion 61 being sufficiently shaped and/or formed for ensuring a continuous, effective seal at or along sealing surfaces 66a. Retaining portion 61 is preferably C-shaped as shown in FIG. 2, and at least partially wraps or surrounds a garter spring 32 or other suitable retaining device. Garter spring 32 in turn circumscribes at least one of the primary lips 27 to impart a sufficient "squeeze" or sealing force thereto. In this manner, secondary and primary seals 37 and 39, respectively, outer seal arm 34, and inner seal arm 41 are held stationary with respect to the stationary housing 15 (see FIG. 1), with sealing surfaces 66a and 66b providing a dynamic seal with respect to the rotating sleeve 43.

Figure 3:
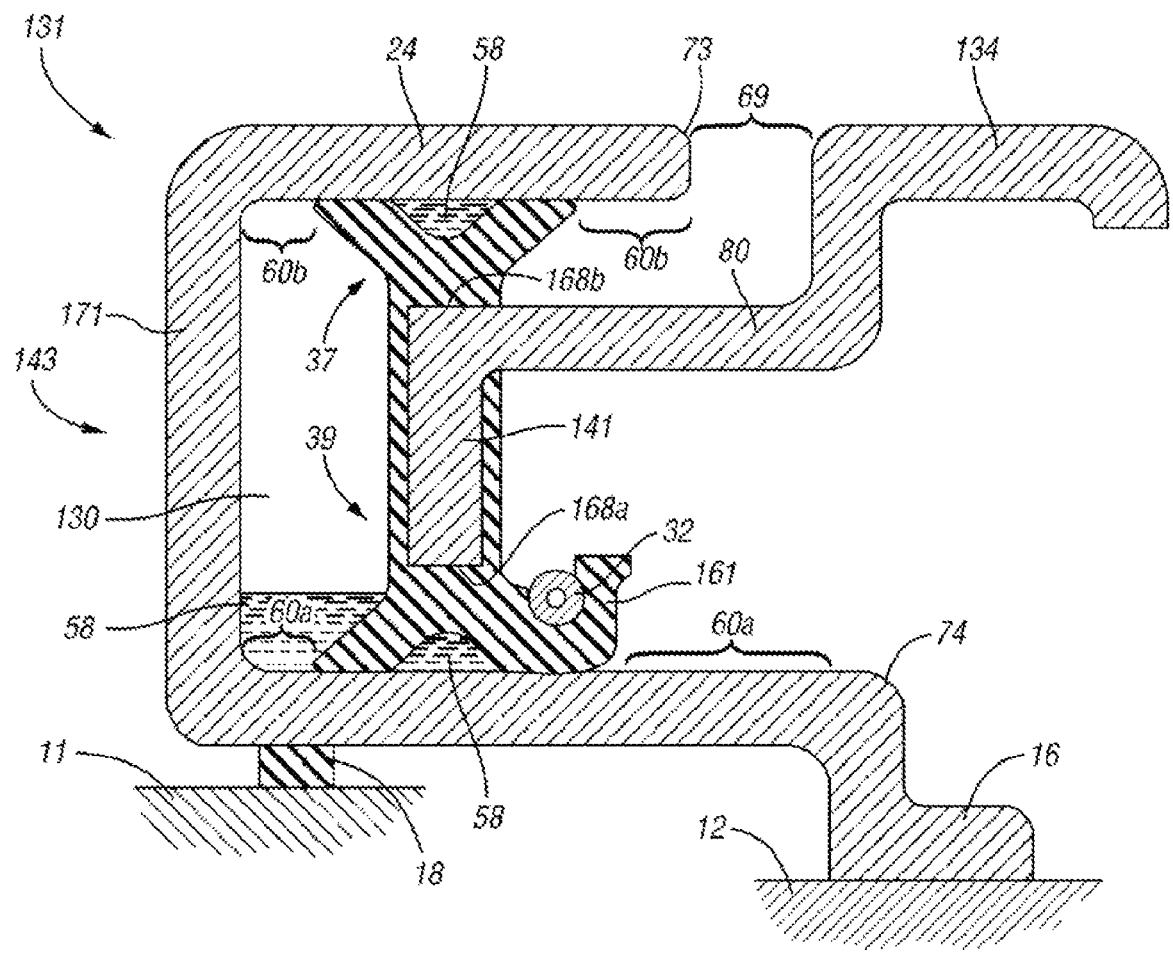
FIG. 3 is a schematic cutaway cross-sectional view of an alternately configured output shaft sleeve and sealing material.

Turning to FIG. 3, and alternately configured shaft seal assembly 131 is shown having a modified stationary outer seal arm 134 configured and/or formed with an elongated or extended center portion 80. Center portion 80 is formed integrally with or attached to inner seal arm 141, which is likewise elongated or extended relative to the previously described inner seal arm 41 (see FIGS. 1 and 2). Main cavity 130 is formed between outer sleeve 24 and inner sleeve 29 of sleeve 143, and bounded on one side by an elongated side sleeve 171. Primary seal 39 and secondary seal 37 are bonded or otherwise attached to inner seal arm 141 at sealing surfaces 168a and 168b, respectively, and are at least partially contained within main cavity 130. Main cavity 130 is axially-compressed and radially-expanded or extended relative to main cavity 30 of FIGS. 1 and 2.

According to this alternate embodiment, secondary seal 37 is radially aligned with primary seal 39, and therefore secondary seal 37 circumscribes the majority of, and preferably substantially all of, primary seal 39. Such a radially-aligned seal configuration may require additional packaging space in the radial direction than would be required for the embodiment of FIGS. 1 and 2, but in exchange may provide an operational advantage due to the greater degree of overlap or circumscription of secondary seal 39 with respect to primary seal 37. This additional overlap or circumscription may in turn provide enhanced sealing protection to the interface 22 (see FIG. 1), and/or extended operating life of primary seal 37.

While the best modes for carrying out the invention have been described in detail, those familiar with the art to which this invention relates will recognize various alternative designs and embodiments for practicing the invention within the scope of the appended claims.

The invention claimed is:

1. A shaft sealing assembly for sealing a shaft interface from debris within a vehicle powertrain having a stationary transmission housing and a first rotatable shaft coaxially aligned with and circumscribed by a second rotatable shaft, the shaft interface being between the first and the second shafts, the assembly comprising:
 a primary seal and a secondary seal each formed at least partially of flexible sealing material, and each having a V-profile forming a pair of sealing lips and a secondary sealing cavity between the pair of sealing lips of each of the primary seal and the secondary seal; and
 a rotatable shaft sleeve having an inner sleeve and an outer sleeve forming a main cavity therebetween, the inner sleeve terminating in a sleeve foot that is press-fitted onto the first rotatable shaft such that a rotation of the first rotatable shaft directly rotates the rotatable shaft sleeve, wherein said rotatable shaft sleeve circumscribes the shaft interface, and wherein said main cavity at least partially encloses at least one of said primary and said secondary seals;
 wherein said secondary seal is positioned adjacent to said outer sleeve in contact therewith, and wherein said primary seal is positioned adjacent to said inner sleeve in contact therewith, said secondary seal circumscribing at least part of said primary seal to thereby minimize exposure of said primary seal to the debris.

2. The assembly of claim 1, wherein said first pair of sealing lips contacts said inner sleeve along a first pair of sealing surfaces, and wherein said second pair of sealing lips contacts said outer sleeve along a second pair of sealing surfaces.

3. The assembly of claim 2, further including a lubricating fluid, wherein said lubricating fluid at least partially fills at least one of said main cavity, said primary sealing cavity, and said secondary sealing cavity to thereby provide an additional barrier to the debris.

4. The assembly of claim 1, further comprising a stationary seal arm positioned adjacent to the stationary transmission housing in contact therewith, wherein said primary seal and said secondary seal are bonded to said stationary seal arm, and wherein said secondary seal circumscribes the shaft interface.

5. The assembly of claim 1, wherein said sleeve has a side sleeve joining said inner sleeve and said outer sleeve, and wherein at least one of said primary seal and said secondary seal is positioned a sufficient distance from said side sleeve to thereby form an end gap accounting for any axial motion of the shafts.

6. The assembly of claim 5, wherein said sufficient distance is approximately 1 to 8 millimeters.

7. An axle seal for minimizing exposure of an axle joint to debris, the axle joint having a first rotatable shaft coaxially aligned with and circumscribed by a second rotatable shaft to thereby form the shaft interface between the first and the second shafts, the axle seal comprising:
 an inner sleeve terminating in a sleeve foot that is press-fitted onto the first rotatable shaft such that a rotation of the first rotatable shaft directly rotates the rotatable sleeve;
 an outer sleeve;
 a main cavity at least partially formed between said inner and said outer sleeves; and
 flexible sealing material positioned at least partially within said main cavity, said flexible sealing material having a first V-profile forming a first pair of seal lips positioned adjacent to and contacting said inner sleeve, and a second V-profile having a second pair of sealing lips positioned adjacent to and contacting said outer sleeve, said first set of seal lips forming a primary sealing cavity therebetween, and said second set of seal lips forming a secondary sealing cavity therebetween, wherein said secondary seal is sufficiently positioned with respect to said primary seal so as to minimize exposure of the primary seal and the axle joint to the debris.

8. The axle seal of claim 7, including lubricating fluid, wherein at least one of said main cavity, said primary seal cavity, and said secondary seal cavity is at least partially filled with said lubricating fluid to thereby form an additional sealing barrier against the debris.

9. The axle seal of claim 7, further comprising a stationary seal arm at least partially circumscribing the axle joint, wherein said stationary seal arm is positioned adjacent to said stationary transmission housing in contact therewith, and wherein said flexible sealing material is bonded to said stationary seal arm.

10. The axle seal of claim 7, including a side sleeve joining said inner sleeve and said outer sleeve, wherein at least one of said primary seal and said secondary seal is positioned a sufficient distance away from said side sleeve to thereby form a suitable end gap accounting for any axial motion of the axle joint.

11. The axle seal of claim 10, wherein said sufficient distance is approximately 1 to 8 millimeters.

12. A vehicle powertrain comprising:
a stationary transmission housing;
a rotatable transmission output shaft;
a drive shaft operatively connected to said transmission output shaft to form a shaft interface therebetween, wherein the drive shaft circumscribes the output shaft at one end of the output shaft;
a rotatable sleeve sufficiently shaped to form a main cavity, said rotatable sleeve being operatively connected to said output shaft and to said drive shaft to rotate therewith, wherein said rotatable sleeve at least partially circumscribes said shaft interface, and terminates in a sleeve foot that is press-fitted to the output shaft such that a rotation of the output shaft directly rotates the rotatable sleeve; and
a primary seal and a secondary seal each at least partially enclosed within said main cavity;
wherein said primary seal and said secondary seal are positioned adjacent to different surfaces of said sleeve, and each said primary seal and said secondary seal have a V-profile forming a pair of sealing lips, with a secondary sealing cavity defined between the respective pair of sealing lips of each of the primary seal and the secondary seal, and wherein said secondary seal at least partially circumscribes said primary seal to thereby minimize exposure of said primary seal and said shaft interface to debris.

13. The powertrain of claim 12, including lubricating fluid, wherein said main cavity and said sealing cavities are at least partially filled with said lubricating fluid to thereby form a barrier for minimizing said exposure.

14. The powertrain of claim 12, wherein said sleeve includes a side portion, an outer portion, and an inner portion, said side portion joining said outer portion and said inner portion, wherein at least one of said primary seal and said secondary seal is positioned approximately 1 to 8 millimeters away from said side portion to form a sufficient end gap accounting for any axial motion of the transmission output shaft and said drive shaft.

15. The powertrain of claim 12, further comprising a stationary seal arm, wherein said stationary seal arm is positioned adjacent to said stationary transmission housing in contact therewith, and wherein said primary seal and said secondary seal are bonded to said stationary seal arm and provide a dynamic seal against said rotatable sleeve when said rotatable sleeve is rotating.

* * * * *